(12) United States Patent
Kauffman et al.

(10) Patent No.: US 11,981,565 B2
(45) Date of Patent: May 14, 2024

(54) MICROWAVE ACTIVE METAL OXIDES FOR CO2 DRY REFORMING OF METHANE

(71) Applicant: United States Department of Energy, Washington, DC (US)

(72) Inventors: Douglas R Kauffman, Pittsburgh, PA (US); Jonathan W Lekse, Pittsburgh, PA (US); Christopher Mark Marin, Pittsburgh, PA (US); Eric J Popczun, Pittsburgh, PA (US)

(73) Assignee: United States Department of Energy, Washington, DC (US)

( * ) Notice: Subject to any disclaimer, the term of this patent is extended or adjusted under 35 U.S.C. 154(b) by 626 days.

(21) Appl. No.: 17/079,924

(22) Filed: Oct. 26, 2020

(65) Prior Publication Data
US 2021/0122632 A1 Apr. 29, 2021

Related U.S. Application Data

(60) Provisional application No. 62/926,006, filed on Oct. 25, 2019.

(51) Int. Cl.
*C01B 3/40* (2006.01)
*B01J 23/83* (2006.01)
*B01J 23/889* (2006.01)
*C01G 51/00* (2006.01)

(52) U.S. Cl.
CPC .......... *C01B 3/40* (2013.01); *B01J 23/83* (2013.01); *B01J 23/8892* (2013.01); *C01G 51/70* (2013.01); *C01B 2203/0233* (2013.01); *C01B 2203/0238* (2013.01); *C01B 2203/0855* (2013.01); *C01B 2203/1052* (2013.01); *C01B 2203/1088* (2013.01); *C01B 2203/1241* (2013.01); *C01P 2002/77* (2013.01)

(58) Field of Classification Search
CPC .............. C01B 3/40; C01B 2203/0233; C01B 2203/0238; C01B 2203/0855; C01B 2203/1052; C01B 2203/1088; C01B 2203/1241; B01J 23/83; B01J 23/8892; C01G 51/70; C01P 2002/77
USPC ........................................................ 252/373
See application file for complete search history.

(56) References Cited

U.S. PATENT DOCUMENTS

| | | | | |
|---|---|---|---|---|
| 2002/0006374 A1* | 1/2002 | Kourtakis | ............... | B01J 23/86 502/304 |
| 2017/0001176 A1* | 1/2017 | D'Souza | ............... | B01J 35/023 |
| 2017/0129777 A1* | 5/2017 | King | .................. | B01J 19/0006 |

FOREIGN PATENT DOCUMENTS

WO WO2008036902 * 3/2008

* cited by examiner

*Primary Examiner* — Douglas B Call
(74) *Attorney, Agent, or Firm* — Aaron R. Keith; Timothy L. Harney; Michael J. Dobbs

(57) ABSTRACT

One or more embodiments relates to compositions, method of using and methods of producing a gas mixture. The method includes supplying a composition $La_xSr_yCo_zM_wO_3$, where x ranges from 0.5 to 1, y ranges 0.0 to 1-x, z ranges from 0.1 to 1.0, and M is a dopant or dopants where w ranges from 0.0 to 1-z; and energizing the composition directly using electromagnetic energy to heat the composition to a temperature above 700° C. The method further includes contacting the composition with a reactant gas mixture comprising methane and an oxidant forming a product gaseous mixture.

7 Claims, 9 Drawing Sheets

FIGURE 7A
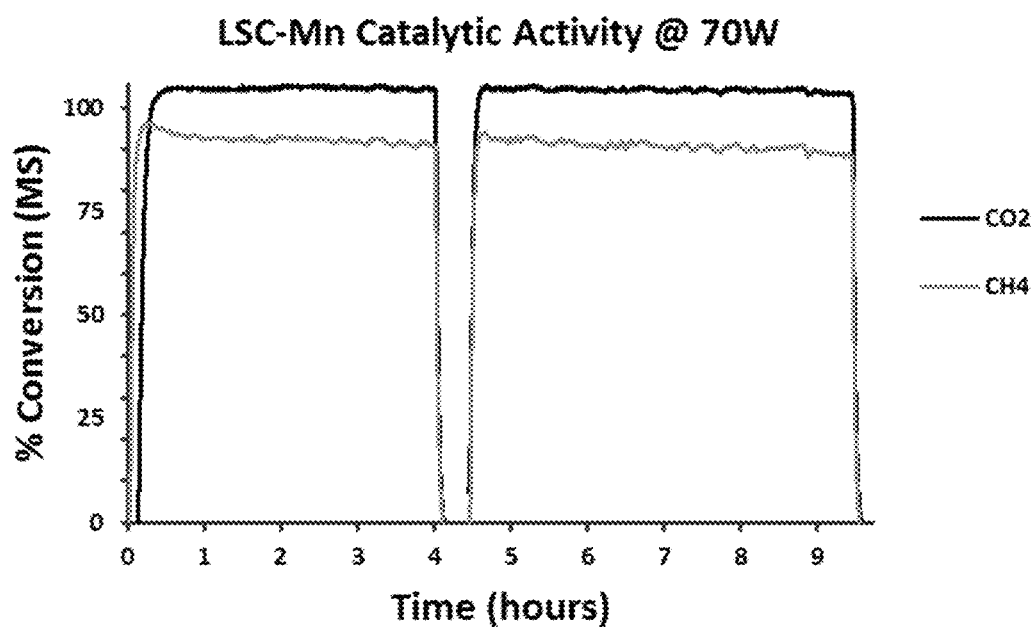
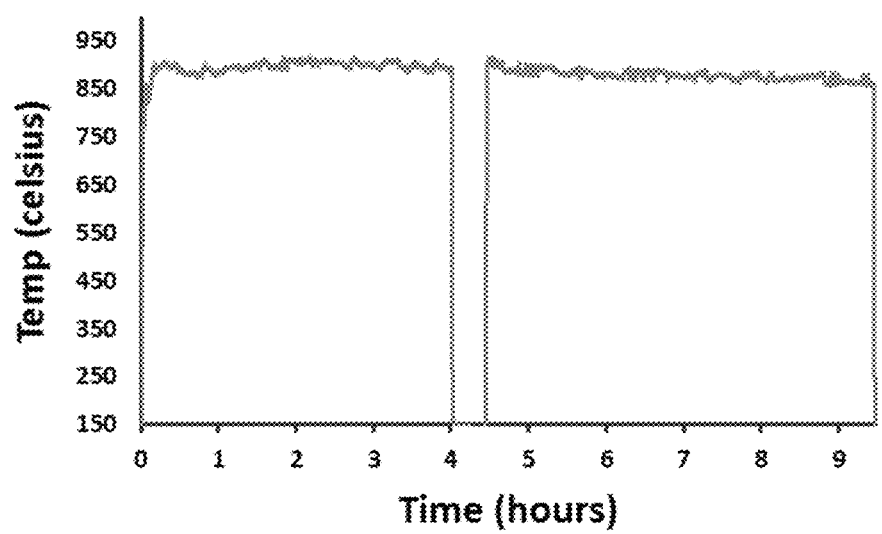
FIGURE 7B

MICROWAVE ACTIVE METAL OXIDES FOR CO2 DRY REFORMING OF METHANE

CROSS-REFERENCE TO RELATED APPLICATIONS

This application claims the benefit of and priority to U.S. Provisional Application 62/926,006 filed Oct. 25, 2019 titled MICROWAVE ACTIVE METAL OXIDES FOR $CO_2$ DRY REFORMING OF METHANE, which is incorporated herein by reference in its entirety.

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments consistent with the present disclosure relates to metal oxide compositions and methods of use for metal oxide compositions for the microwave-assisted dry reforming of methane.

BACKGROUND

Traditional steam reforming of methane to produce $H_2$, which is then reacted with CO to produce methanol and other industrial commodity chemicals is an extremely energy intensive process with large carbon footprint. For example, the steam reforming reaction produces 10 tons of $CO_2$ for every ton of $H_2$.

Methane dry reforming uses an alternative reaction that uses $CO_2$ as a soft oxidant to produce CO and $H_2$ from methane, which can be further processed into methanol or hydrocarbons. Further, using $CO_2$ to produce commodity chemicals, such as $H_2$ and CO, can generate revenue to offset carbon capture costs, reduce the carbon footprint of fossil-fuel powered processes, and allow sustainable use of fossil fuel resources. Unfortunately, dry reforming is extremely energy intensive and requires very high temperatures (>800 C) that make it unpractical economically compared with the lower-temperature, carbon-positive, methane steam reforming.

Microwave-assisted catalysis have been proposed as an enabling technology for high temperature chemical processes. Unlike traditional thermal heating, microwaves can rapidly heat catalysts to extremely high temperatures. This allows the reactors to utilize excess renewable energy on an intermittent basis (load follow) to promote traditionally challenging, thermally-driven reactions. Moreover, microwaves directly heat the catalyst material, generally not the entire reactor body, which reduces many of the traditional heat management challenges associated with high temperature dry reforming of methane. Microwave absorption is a function of the electronic and magnetic properties of the material, and a properly designed catalyst may function as a both a microwave heater and a reactive surface for driving the desired reaction. However, microwave absorption is extremely sensitive to the catalysts chemical state and electronic structure, and effective catalysts must maintain microwave activity across a wide range of temperatures and in both oxidative and reductive environments.

Accordingly, it is an object of this disclosure to provide metal oxide catalyst compositions and a method for their use to address the issues described above. The present disclosed compositions provide a class of metal oxides that absorb microwaves to rapidly heat to high temperatures (700-1000° C., alternatively above 800° C.) to promote dry reforming reactions. This allows the use of inexpensive, excess/curtailed renewable electrons and/or load following for on-demand chemical production in small, modular reactors. The compositions and methods for their use may also be applied to other natural gas components (ethane, etc.) or other thermal reactions. These and other objects, aspects, and advantages of the present disclosure will become better understood with reference to the accompanying description and claims.

SUMMARY

One or more embodiments relates to compositions, method of using and methods of producing a gas mixture. The method includes supplying a composition $La_xSr_yCo_zM_wO_3$, where x ranges from 0.5 to 1, y ranges 0.0 to 1-x, z ranges from 0.1 to 1.0, and M is one or more dopants where w ranges from 0.0 to 1-z; and energizing the composition directly using electromagnetic energy to heat the composition to a temperature above 700° C. The method further includes contacting the composition with a reactant gas mixture comprising methane and an oxidant forming a product gaseous mixture.

Yet another embodiment relates to a method of producing a gas mixture. The method includes supplying a composition $La_xSr_yCo_zM_wO_3$, where x ranges from 0.5 to 1, y ranges 0.0 to 1-x, z ranges from 0.6 to 1.0, and M is one or more dopants where w ranges from 0.0 to 1-z; and energizing the composition directly using energy to heat the composition to a temperature at or above 700° C.; and one or more embodiments includes contacting the composition with a reactant gas mixture comprising methane and an oxidant to produce a product gaseous mixture.

Embodiments may include the energy comprises microwave energy and/or may include heating the composition. The composition may be heated at or above 800° C. Embodiments may include the oxidant comprises a pure stream; comprises a mixture of at least $CO_2$ and water; and/or another other appropriate oxidant.

Other embodiments of the method may include the product gaseous mixture comprises hydrogen and carbon monoxide, where the reactant gaseous mixture is converted at or above 50% to gaseous mixture with about or above 50% selectivity to hydrogen and carbon monoxide. Exemplary embodiments include the reactant gaseous mixture is converted at or above 97% to gaseous mixture with about or above 96% selectivity to hydrogen and carbon monoxide.

Still another embodiment relates to a metal oxide composition, here the composition comprises $La_xSr_yCo_zM_wO_3$, where x ranges from 0.5 to 1, y ranges 0.0 to 1-x, z ranges from 0.1 to 1.0, and M is a dopant or dopants where w ranges from 0.0 to 1-z.

In one or more embodiments of the composition M is selected from the group consisting of Mn, Fe, Ni, Cu, or a combination thereof, and the composition is microwave-active. The composition $La_xSr_yCo_zM_wO_3$ may be $La_{0.8}Sr_{0.2}CoO_3$ or $La_xSr_{1-x}Co_yMn_zO_3$ with x, y, z between 0 and 1.

BRIEF DESCRIPTION OF THE DRAWINGS

The invention together with the above and other objects and advantages will be best understood from the following detailed description of the preferred embodiment of the invention shown in the accompanying drawings, wherein:

FIGS. 7A-7B depict a graphical illustration of conversion of $CO_2$ before and after an off period;

DETAILED DESCRIPTION

The foregoing summary, as well as the following detailed description of certain embodiments of the present invention, should be read with reference to the drawings in which similar elements in different drawings are numbered the same. The drawings, which are not necessarily to scale, depict illustrative embodiments and are not intended to limit the scope of the invention.

One or more embodiments relates to compositions, method of using and methods of producing a gas mixture. Embodiments consistent with the present disclosure relates to metal oxide compositions and methods of use for metal oxide compositions for the microwave-assisted dry reforming of methane.

The disclosure provides metal oxides (LSC) and transition metal doped metal oxides (LSC-M). The compositions have the formula $La_xSr_yCo_zM_wO_3$, where x ranges from 0.5 to 1, y ranges 0.0 to 1-x, z ranges from 0.1 to 1.0, and M is a dopant or dopants where w ranges from 0.0 to 1-z. One exemplary composition is the LSC $La_{0.8}Sr_{0.2}CoO_3$. Another exemplary composition LSC-M having the formula $La_{0.8}Sr_{0.2}Co_{0.8}Mn_{0.2}O_3$.

Figure 1:
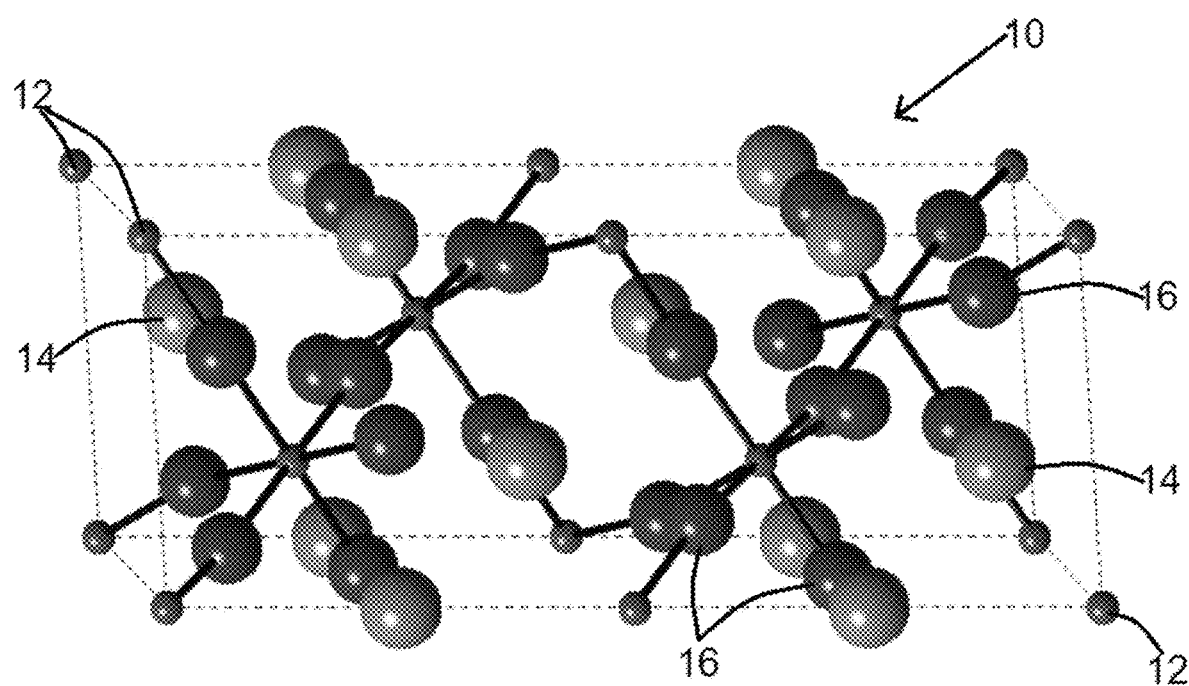
FIG. 1 depicts the structure of a LSC or LSC-M composition.

FIG. 1 depicts the structure of a LSC or LSC-M composition 10. As depicted in FIG. 1, the LSC or LSC-M compositions 10 include Strontium (Sr) or Lanthanum (La) 12 doped with transition elements 14 such as Cobalt or other dopant including Mn, Fe, Ni, and Cu ($La_xSr_yCo_zM_wO_3$) and oxygen 16. The dopants 14 act to modify the reducibility of the catalyst to extend the useable temperature range of the catalyst.

The compositions are formed by solid state reactions, with elemental ratios controlled by adding metal carbonates and oxides in the desired ratios, blending (grinding), and furnace firing to form the desired perovskite. Additionally, the compositions of the present disclosure are microwave-active catalysts, such that in energizing, they absorb microwaves and generate heat available to drive reactions.

Figure 2:
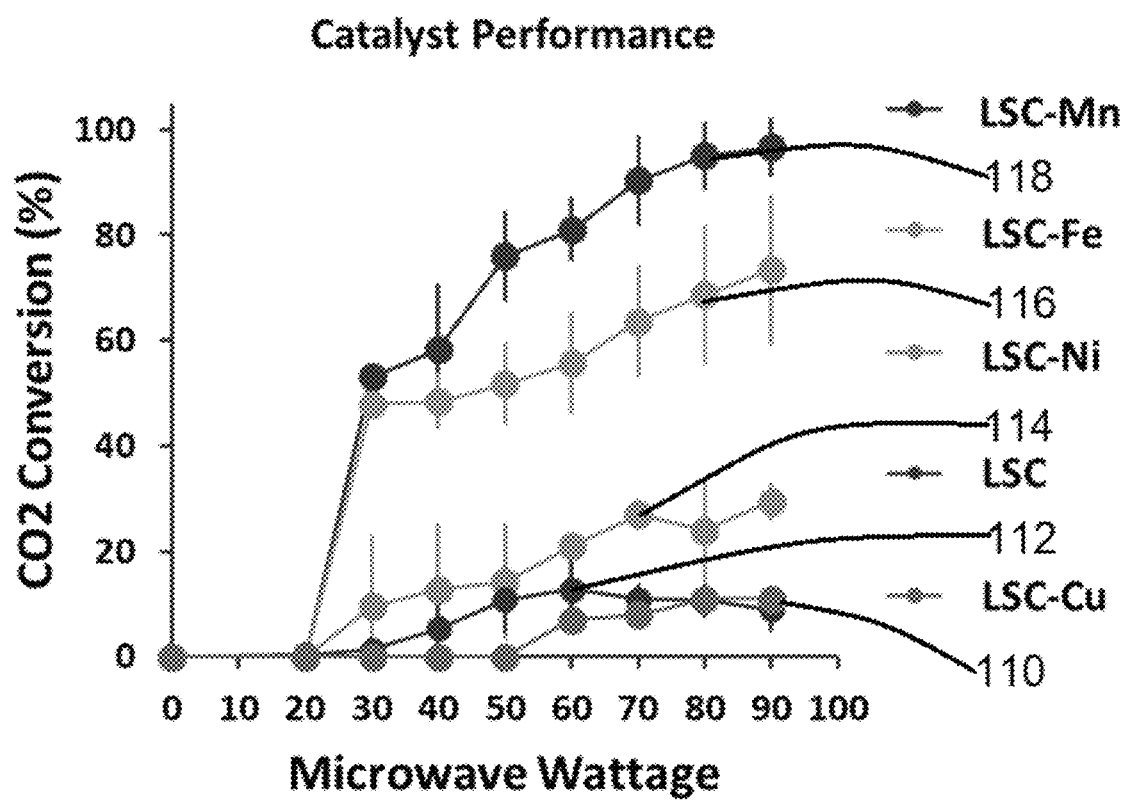
FIG. 2 depicts a graphical illustration of LSC and LSC-M $CO_2$ conversion under microwave heating.

FIG. 2 depicts a graphical illustration of catalyst performance of $CO_2$ conversion under microwave heating LSC and LSC-M compositions. In FIG. 2, the blue line 110 depicts the $CO_2$ conversion under microwave heating of LSC-Cu, the black line 112 depicts the $CO_2$ conversion under microwave heating of LSC, the green line 114 depicts the $CO_2$ conversion under microwave heating of LSC-Ni, the orange line 116 depicts the $CO_2$ conversion under microwave heating of LSC-Fe and the red line 118 depicts the $CO_2$ conversion under microwave heating of LSC-Mn.

Figure 3:
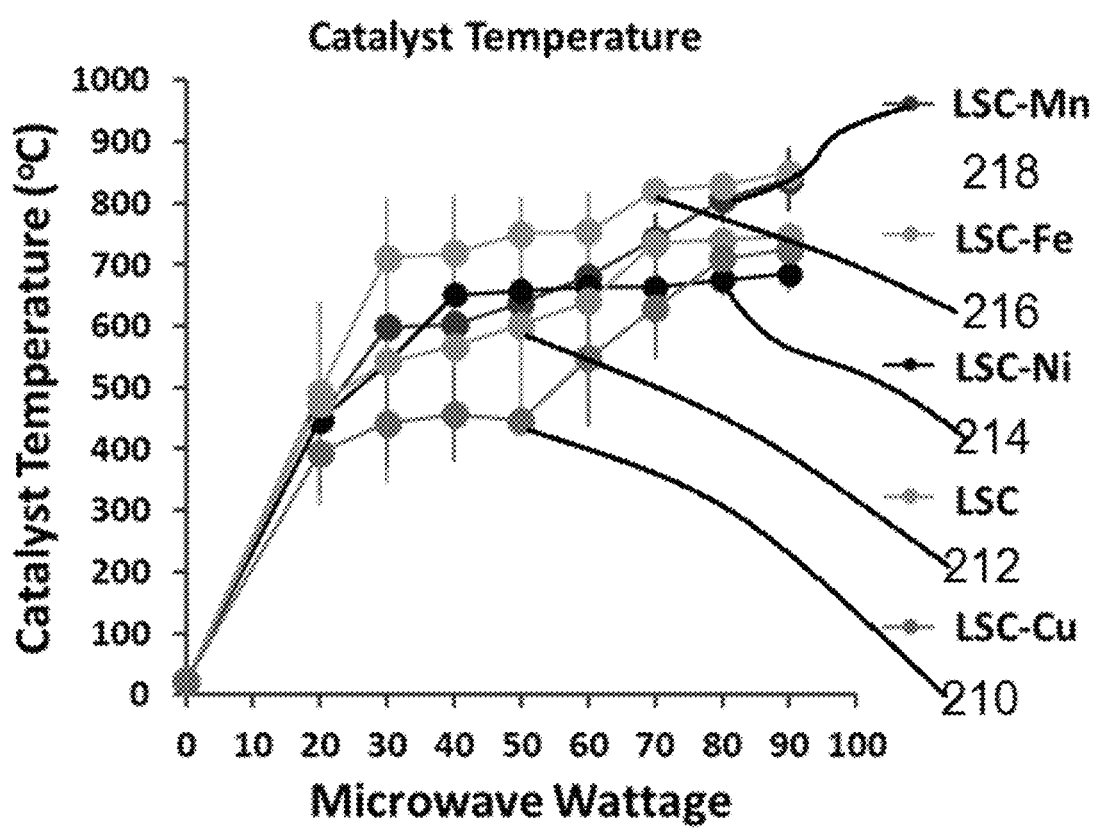
FIG. 3 depicts a graphical illustration of LSC and LSC-M $CO_2$ temperature under microwave heating.

FIG. 3 depicts a graphical illustration of catalyst temperature of LSC and LSC-M $CO_2$ temperature under microwave heating (measured in microwave wattage). In FIG. 3, the blue line 210 depicts the temperature under microwave heating of LSC-Cu, the green line 212 depicts the temperature under microwave heating of LS, the black line 214 depicts the temperature under microwave heating of LSC-Ni, the orange line 216 depicts the temperature under microwave heating of LSC-Fe and the red line 218 depicts the temperature under microwave heating of LSC-Mn.

One or more embodiments of the compositions are useful in the conversion of $CO_2$ and $CH_4$ to CO and $H_2$. In one exemplary method, a composition $La_xSr_yCo_zM_wO_3$, where x ranges from 0.5 to 1, y ranges 0.0 to 1-x, z ranges from 0.1 to 1.0 but in one or more embodiments, from 0.6 to 1.0, and M is a dopant where w ranges from 0.0 to 1-z is supplied to a reaction vessel. The composition is energized with microwave energy to heat the composition to a temperature at or above 700° C. (above 800° C. for example). The heated composition is contacted (brought into chemical communication) with a reactant gas mixture comprising methane and an oxidant ($CO_2$) to produce a gaseous mixture. Where the reactant gas mixture comprises $CO_2$ and methane, the gaseous mixture comprises $H_2$ and CO. In a preferred embodiment, the gaseous mixture is $H_2$ and CO in a near 1:1 ratio. In one embodiment, the method provides where reactant gas is converted to about or above 50% to gaseous mixture with about or above 50% selectivity, but in one or more embodiments reactant gas is converted to about or above 97% to gaseous mixture with about or above 96% selectivity to hydrogen and carbon monoxide.

Figure 4:
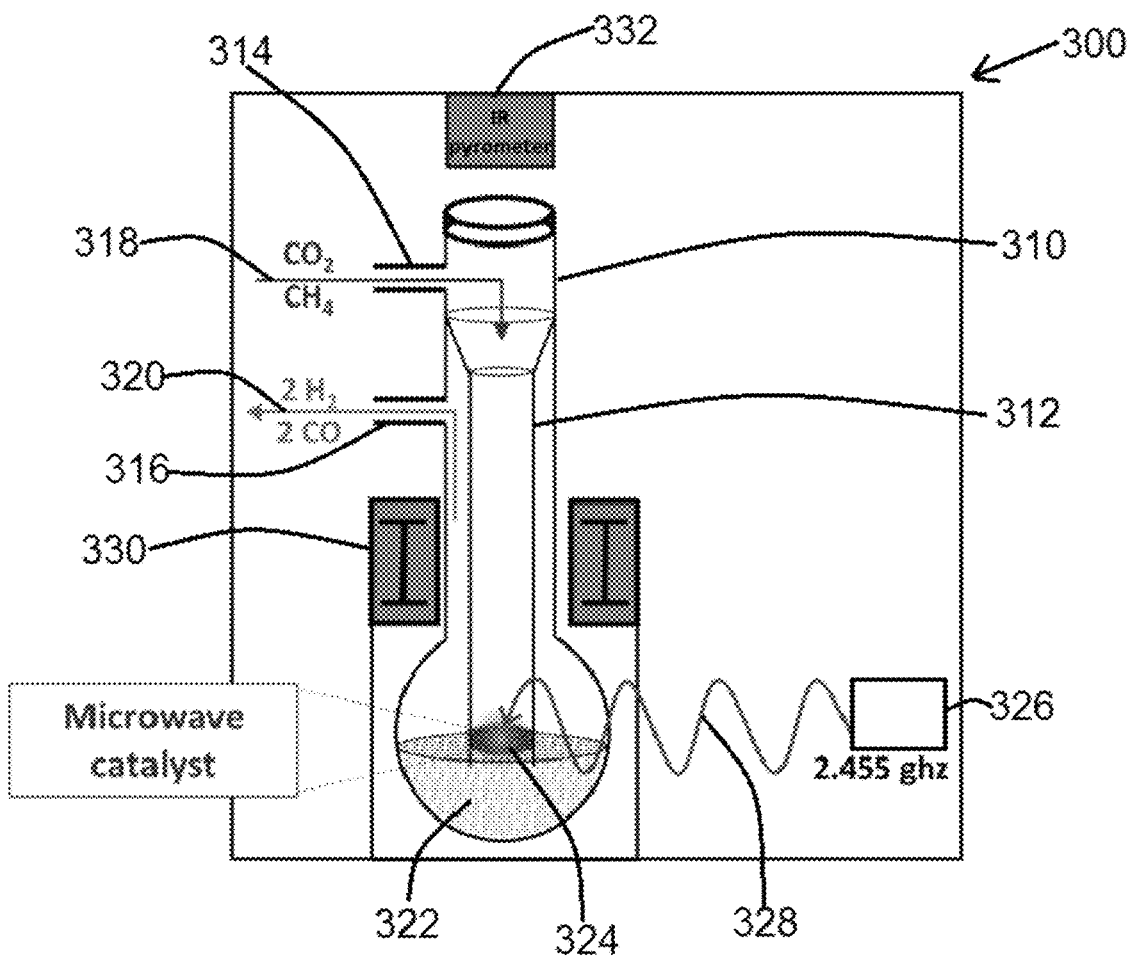
FIG. 4 depicts a 2D representation of a microwave reactor for performing one embodiment of the disclosed method.

FIG. 4 depicts a 2D representation of a microwave reactor 300 for performing the disclosed method of producing a gas mixture. The reactor 300 includes a first column 310 containing second column 312. In the illustrated embodiment, first column 310 includes first opening 314 in fluid communication with the interior of first column 310 and second column 312, while second opening 316 is in fluid communication with at least the interior of first column 310. In the illustrated embodiment first opening 314 enables ingress of $CO_2$ and $CH_4$ 318 into the interior of first column 310 and second column 312 and second opening 316 enables egress of $H_2$ and CO 320.

Reactor 300 contains a liquid or catalyst 322 and microwave catalyst 324. In one embodiment, the microwave catalyst 324 is heated by electromagnetic energy. In the illustrated embodiment, the microwave catalyst 324 is heated by microwave energy 328 (at 2.445 ghz for example) generated by a microwave source 326. Reactor 300 further includes a microwave attenuator 330 and IR pyrometer 332.

Figure 5:
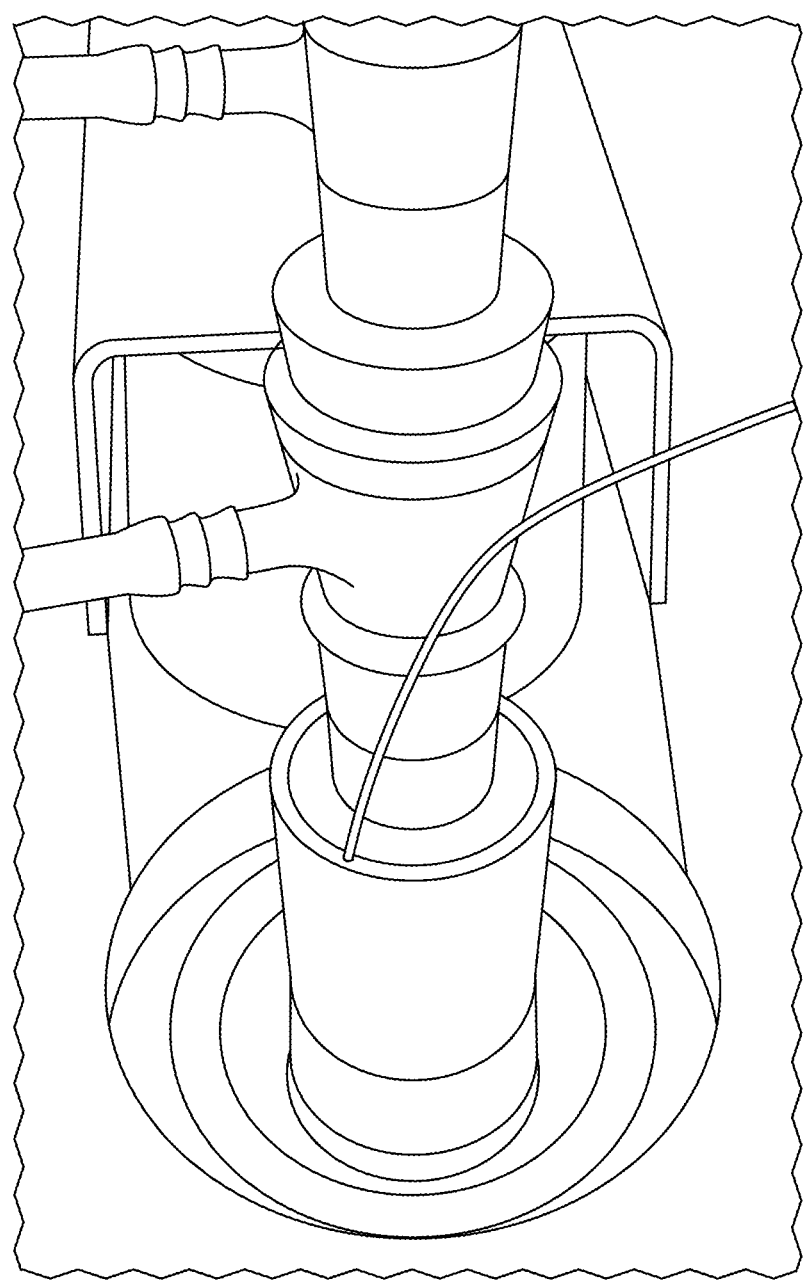
FIG. 5 depicts a 3D representation of the microwave reactor of FIG. 4 for performing one embodiment of the disclosed method.

FIG. 5 depicts a 3D representation of the microwave reactor 300 of FIG. 4 for performing the disclosed method.

Figure 6:
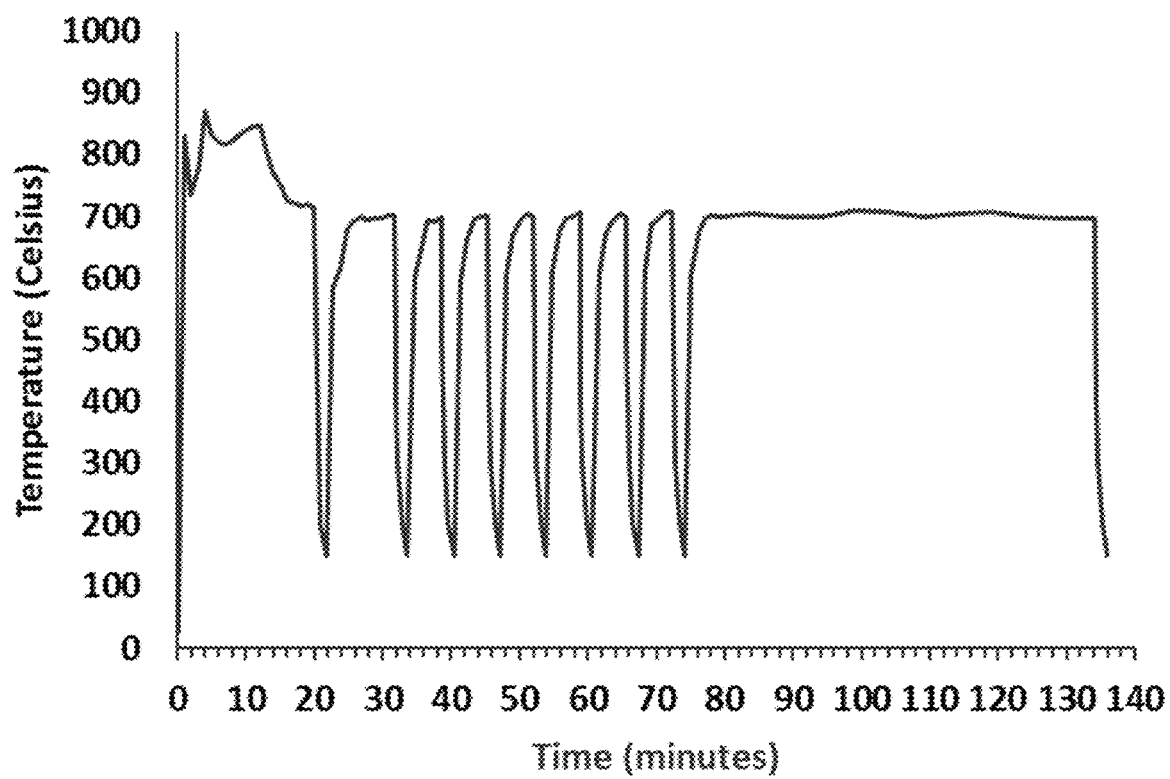
FIG. 6 depicts a graphical illustration of repeated rapid cycling of the compositions under microwave heating.

FIG. 6 depicts a graphical illustration of repeated rapid cycling of the compositions under microwave heating in accordance with one embodiment. More specifically, FIG. 6 depicts a Time vs. Temp graph illustrating repeated rapid cycling of an LSC catalyst at 70 Watts of cycled power.

FIGS. 7A-7B depict graphical illustrations of one embodiment of conversion of $CO_2$ before and after an off period and long-term deactivation mitigations by heating in air where FIG. 7A illustrates % Conversion (where the black line indicates $CO_2$ and the orange line $CH_4$) while FIG. 7B illustrates Temperature. The microwave absorptive cobalt based perovskite compositions in this embodiment provide thermal stability at temperatures in excess of 1000° C., unlike conventional carbon-based microwave absorbers which must be kept below 900° C. to avoid pyrolytic carbon sublimation. The electronic conductivity of these oxides allows them to resistive heat in the microwave similar to metals or carbon-based absorbers while also maintaining conductivity in oxidative environments. Further, the compositions and method allow the rapid heating of the microwave reactor catalyst bed and are able to ramp from a ground state to reaction temperature (>700° C.) in less than 3 minutes with consistent on-off cyclability. Using such a method, temperatures of 850° C. and over 90% dry reforming of methane conversion with an almost ideal 1:1 CO to $H_2$ ratio have been achieved using less than 100 W of applied microwave power, demonstrating the suitability of microwave catalysts for rapid, efficient, and carbon neutral syngas production.

Figures 8A, 8B:
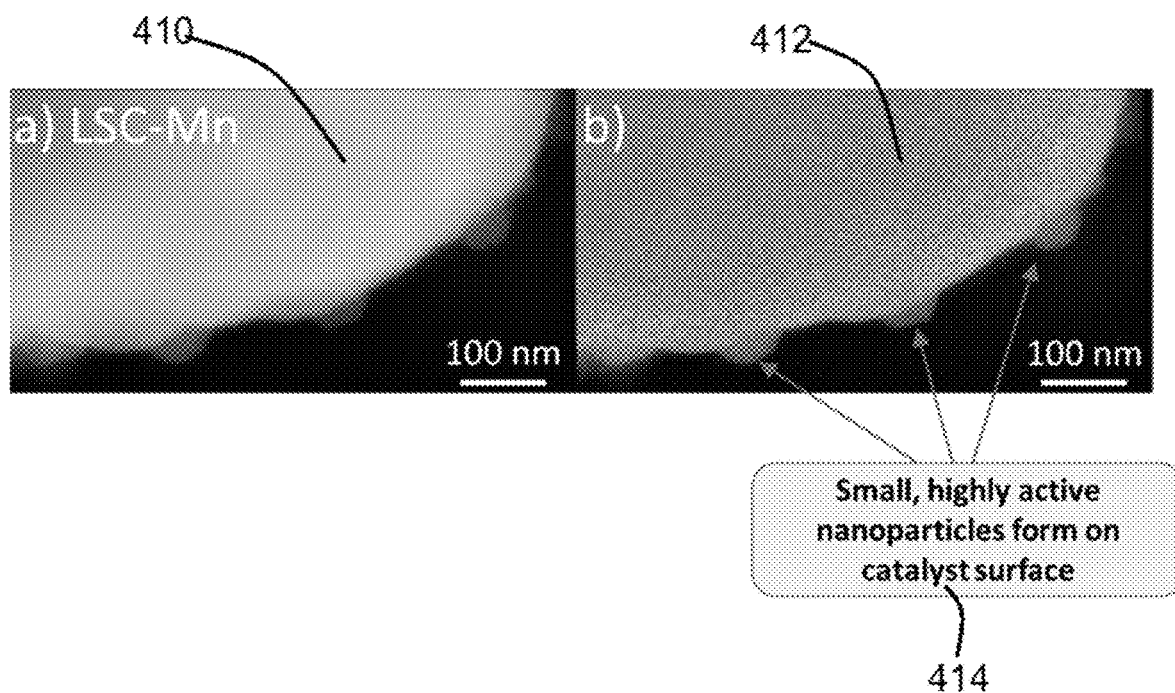
FIGS. 8A-8B depict an image of composition active sites.

It should be appreciated that Mn dopants are hard to reduce. The Mn dopants sustain catalyst structure and prevent cobalt segregation at high temperatures. Such dopants form much smaller more active Co nanoparticle catalyst sites. FIGS. 8A-8B depicts an image of composition active sites. FIG. 8A depicts LSC-Mn 410 while FIG. 8B depicts small, highly active Cobalt nanoparticles 414 formed on the Mn doped LSC 412, which is preferred.

Figure 9:
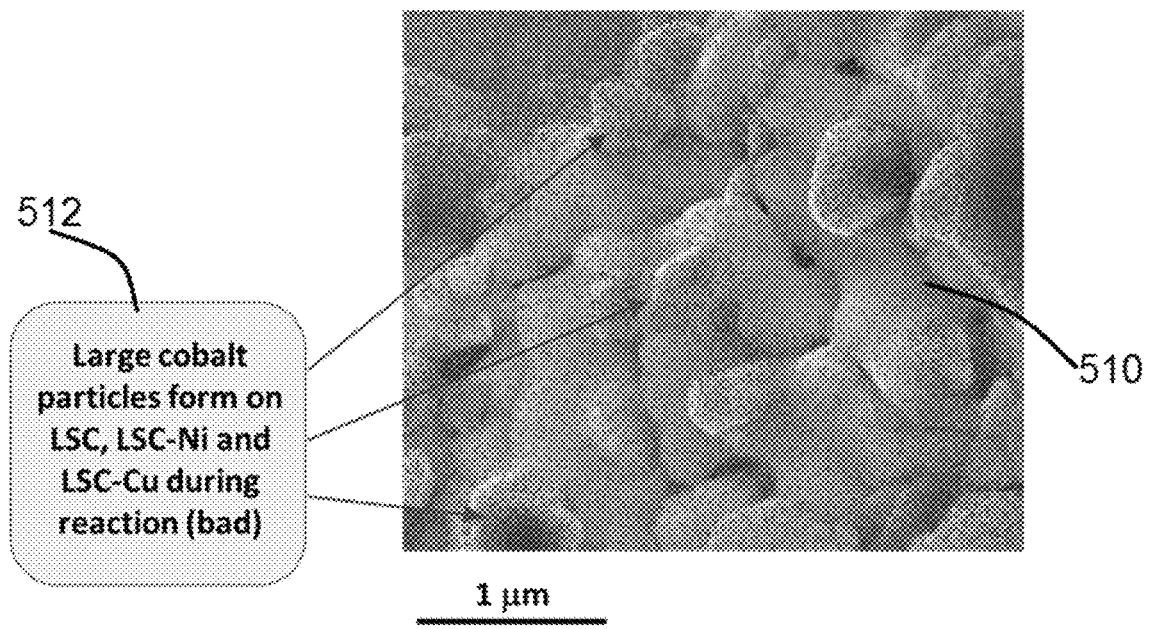
FIG. 9 depicts an image of composition active sites.

It should be appreciated that dopants impact catalyst sites. Cobalt segregates out of undoped LSC, LSC-Ni, and LSC-Cu at high temperatures. It produces large Co particles that are poor catalyst sites. It lowers $CO_2$ and $CH_4$ conversion rates. FIG. 9 depicts an image of composition active sites, where undoped LSC 510 after reaction has large cobalt particles 512 forming on LSC, LSC-Ni and LSC-Cu during reaction, which is not preferred.

The disclosed compositions and method have applications in the conversion of methane and $CO_2$ into CO and $H_2$. The production reactant gasses may be sourced from sequestered $CO_2$ and waste/stranded/flared methane. The resulting production of CO and $H_2$ allow generation of revenue to offset costs from $CO_2$ sequestration activities, and provide a reduced carbon footprint compared to traditional methane dry reforming or steam reforming processes. Additionally, the compositions and methods allow for the development of modular reactors capable of operation at such sequestration or renewable energy sites.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations thereof, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A method of producing a gas mixture, the method comprising the steps of:
   a. supplying a composition $La_xSr_yCo_zM_wO_3$, where x ranges from 0.5 to 1, y ranges 0.0 to 1-x, z ranges from 0.1 to 1.0, and M is at least one dopant where w ranges from 0.0 to 1-z, wherein M is an element selected from the group consisting of Mn, Fe, Ni, Cu, or a combination thereof;
   b. energizing the composition directly using microwave energy to heat the composition to a temperature above 700° C.; and,
   c. contacting the composition with a reactant gas mixture comprising methane and an oxidant forming a product gaseous mixture.

2. The method of claim 1 further comprising heating the composition at or above 800° C.

3. The method of claim 1, where the oxidant comprises $CO_2$.

4. The method of claim 1, where the oxidant comprises a mixture of at least $CO_2$ and water.

5. The method of claim 1, where the product gaseous mixture comprises hydrogen and carbon monoxide.

6. The method of claim 5, where the reactant gaseous mixture is converted at least 50% to gaseous mixture with at least 50% selectivity to hydrogen and carbon monoxide.

7. The method of claim 6, where the reactant gaseous mixture is converted at least 97% to gaseous mixture with at least 96% selectivity to hydrogen and carbon monoxide.

* * * * *